April 21, 1936.  F. A. BEAN  2,037,959
APPARATUS FOR HANDLING BULK MATERIALS
Filed April 26, 1934  5 Sheets-Sheet 2

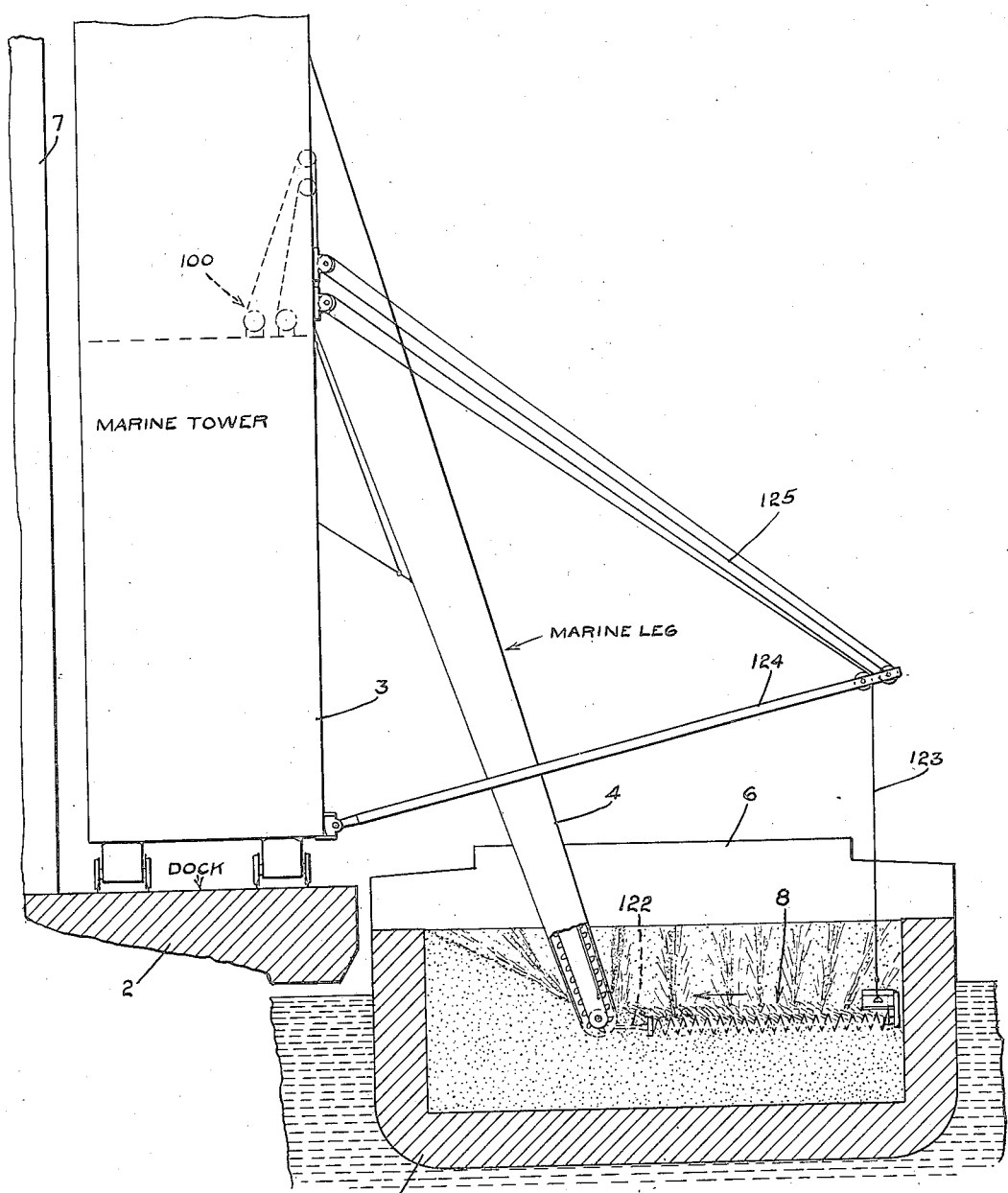

INVENTOR.
FRANCIS A. BEAN
BY
ATTORNEYS.

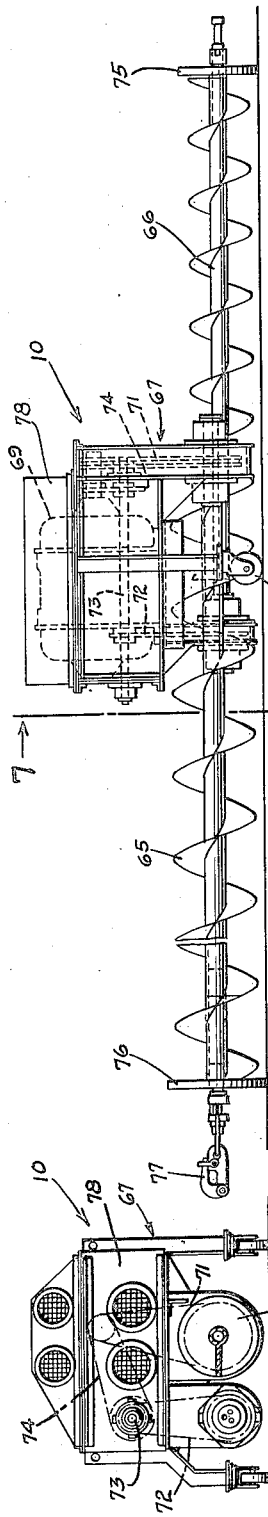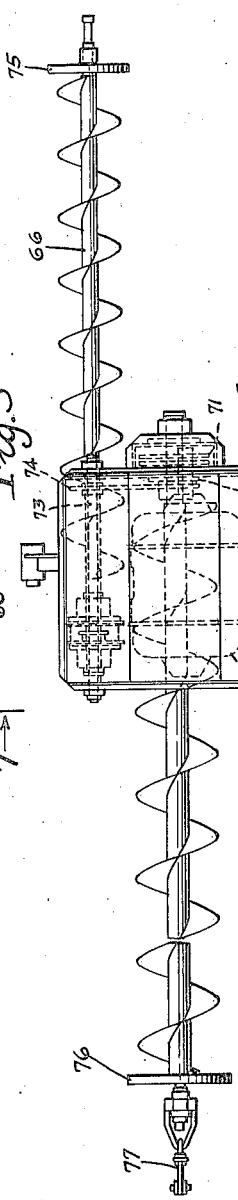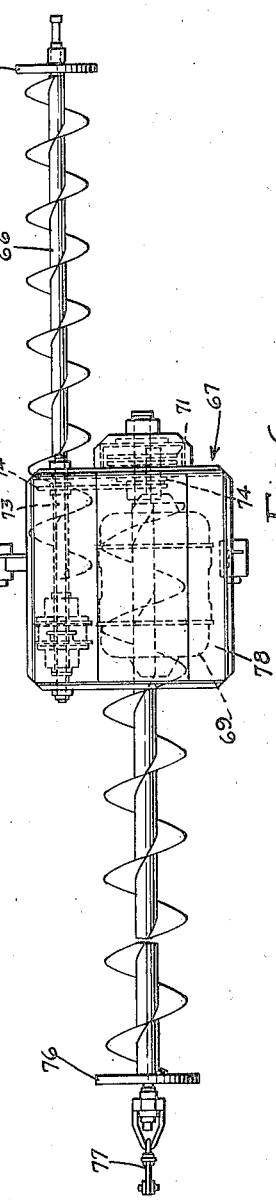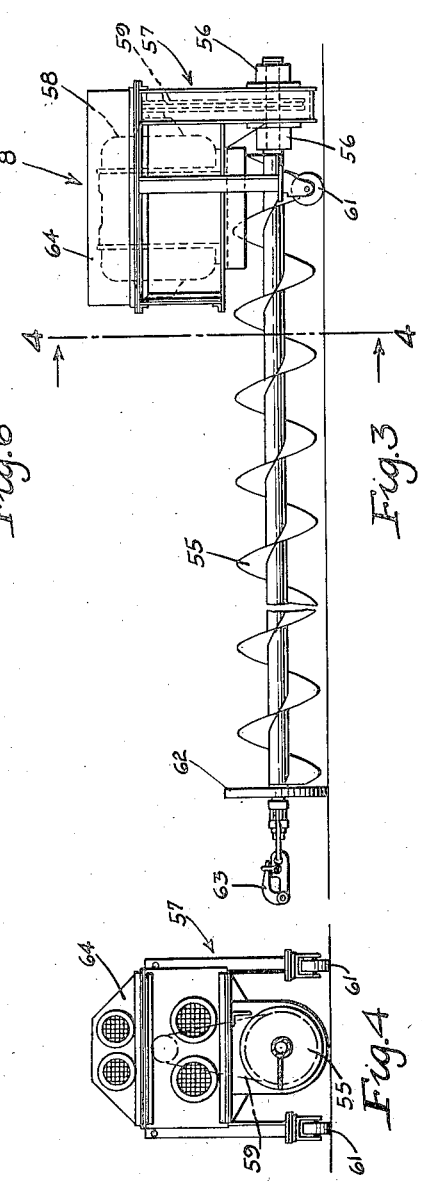

April 21, 1936.   F. A. BEAN   2,037,959
APPARATUS FOR HANDLING BULK MATERIALS
Filed April 26, 1934   5 Sheets-Sheet 4
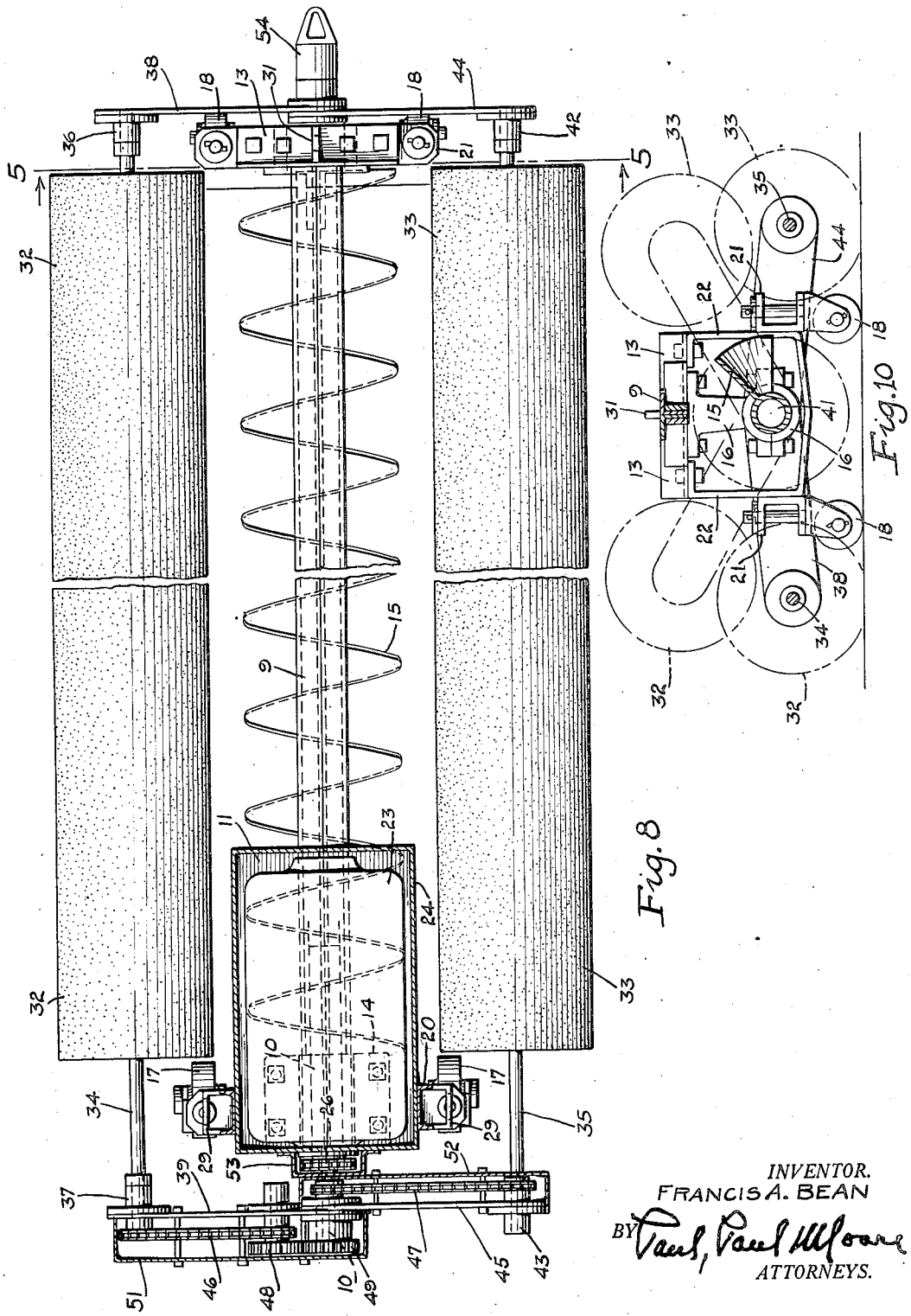
INVENTOR.
FRANCIS A. BEAN
ATTORNEYS.

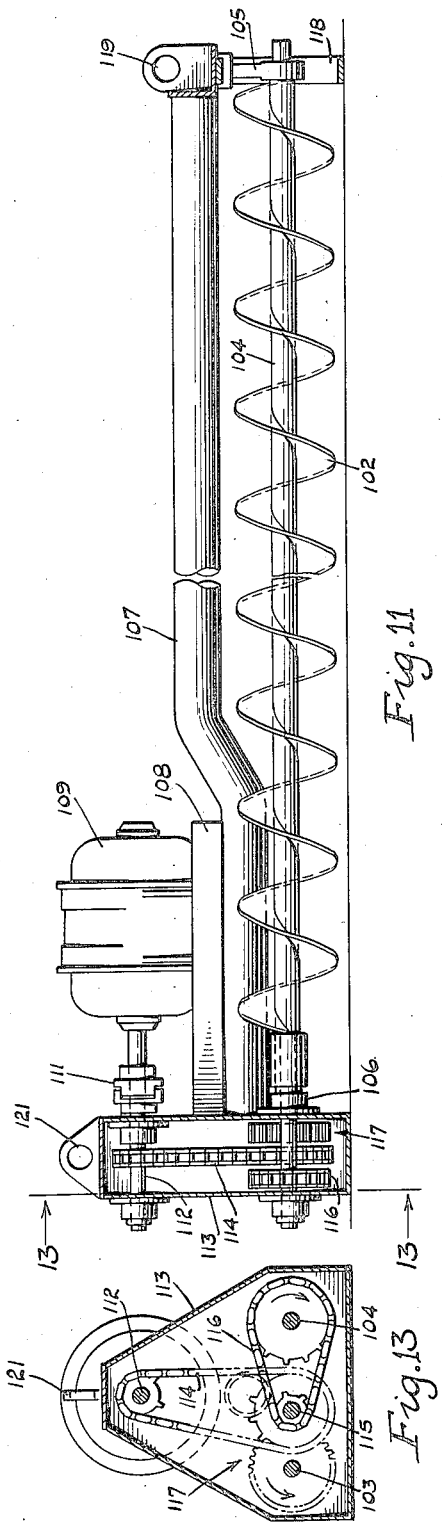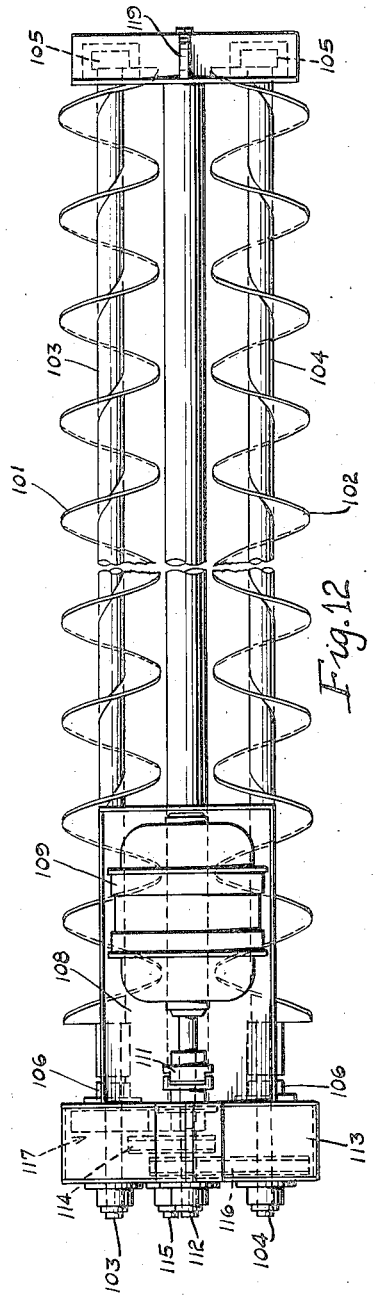

Patented Apr. 21, 1936

2,037,959

UNITED STATES PATENT OFFICE 2,037,959

APPARATUS FOR HANDLING BULK MATERIALS

Francis A. Bean, Minneapolis, Minn., assignor to International Milling Company, Minneapolis, Minn., a corporation of Delaware Application April 26, 1934, Serial No. 722,523

4 Claims. (Cl. 198—213)

This invention relates to an improved system for handling bulk material such as grain, and other materials which may be conveniently handled in bulk form.

The invention contemplates the provision of a new and novel apparatus which is particularly applicable for use at grain terminals, to convey bulk material from one place or elevation to another, as when unloading grain from the hold of a vessel, or removing it from a bin; and an object of the invention is to provide such an apparatus of simple and inexpensive construction, which is efficient and positive in operation; and which may be conveniently handled and manipulated with a minimum of labor.

A further object of the invention is to provide an apparatus of the class described comprising one or more independently operable screw conveyers, so constructed that they may be conveniently moved about in the hold of a vessel, or placed on top of a mass of grain in a bin, whereby practically all of the bulk material may be removed therefrom without manual labor.

A further object is to provide a portable power driven conveyer which may be placed on top of a mass of bulk grain in the hold of a vessel, or in a grain car, whereby it will feed the bulk material towards a given point, such as a marine leg, or the door of a grain car, and which may readily be moved about, whereby it is possible to remove substantially all of the grain from the vessel or car without the use of manual labor, and in a comparatively short period of time.

A further object is to provide a portable conveyer unit comprising an open screw having a motor operatively connected thereto for driving the same, and said unit being so constructed that it may be picked up bodily and placed on top of a mass of bulk material or grain, whereby it will convey the grain in one direction, it being understood that while the unit is in operation, one end thereof is anchored to a suitable support to prevent longitudinal movement of the unit.

Other objects of the invention reside in the unitary construction of the improved conveying unit which comprises a feed screw provided with an independent motor, and having means whereby it may be conveniently moved about from place to place; in the provision of a conveyer unit comprising two oppositely extending screw conveyers having their adjacent ends operatively connected to a single motor, and whereby one end of the unit may be positioned in the corner of a bin or adjacent to a wall whereby practically all of the material may be conveyed thereby to the receiving means, such as a marine leg; in the provision of means for connecting a plurality of rotary elements or brushes to the unit to feed the material inwardly towards the feed screw from opposite sides thereof; and in the provision of a twin screw conveyer comprising two spiral feed screws arranged in spaced parallel relation and rotating in opposite directions, whereby they will cooperate to convey the material between them in a direction lengthwise thereof.

Other objects of the invention will appear from the following description and accompanying drawings and will be pointed out in the annexed claims.

In the accompanying drawings, there has been disclosed a structure designed to carry out the various objects of the invention, but it is to be understood that the invention is not confined to the exact features shown as various changes may be made within the scope of the claims which follow.

In the drawings:

Figure 1 is a diagrammatic view showing the invention as used in connection with an ordinary marine tower elevator to feed the material or grain to the usual bucket elevator thereof;

Figure 3 is a side elevation of a conveyer unit comprising a single open screw having a motor connected to one end thereof;

Figure 4 is a cross-sectional view on the line 4—4 of Figure 3;

Figure 5 is a side elevation of a unit comprising two conveyer screws having their adjacent ends connected to one motor;

Figure 6 is a plan view of Figure 5;

Figure 7 is a cross-sectional view on the line 7—7 of Figure 5;

Figure 8 is a plan view showing a conveyer unit comprising a single feed screw having two rotary brushes mounted adjacent thereto for feeding the material inwardly towards the feed screw;

Figure 10 is a detail sectional view on the line 10—10 of Figure 8;

Figure 11 is a side elevation of a power-operated conveyer unit comprising two feed screws;

Figure 12 is a plan view of Figure 11; and

Figure 13 is a cross-sectional view on the line 13—13 of Figure 11, showing the drive for the feed screws.

Figure 2:
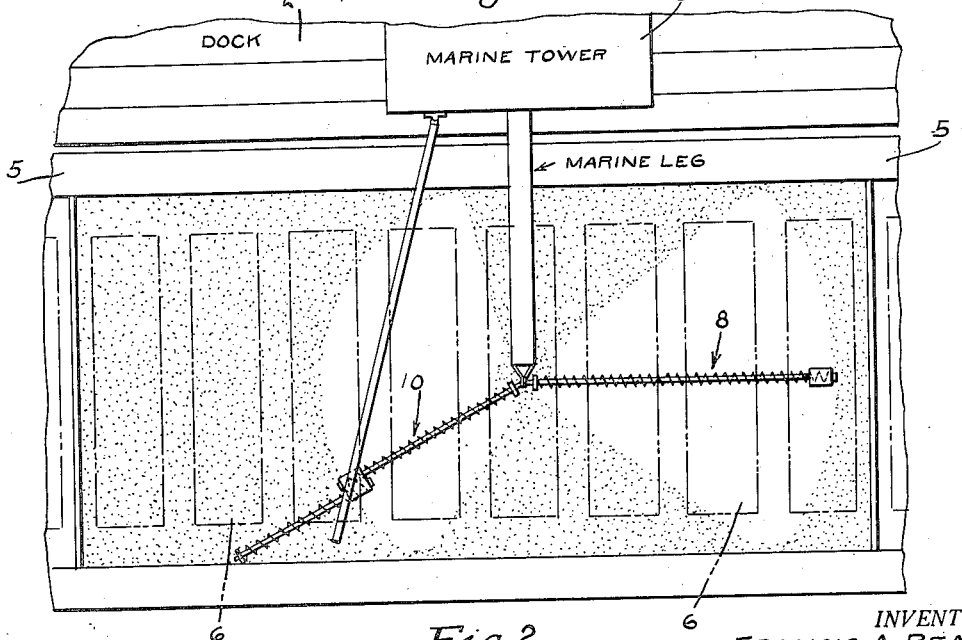
Figure 2 is a diagrammatic plan view of Figure 1, showing two conveyer units connected to the receiving end of the marine leg.

In the selected embodiment of the invention here shown for purposes of disclosure, there is illustrated in Figures 1 and 2, a portion of a dock 2 having a marine tower 3 mounted for traveling movement thereon and comprising a marine leg or bucket elevator 4, which is adjustably supported thereon by suitable means, not shown, whereby the lower end of the leg may be moved into and out of the hull of a boat, indicated generally by the numeral 5 in Figure 1. The elevator 4 is driven in the usual manner, by a suitable motor, not shown, mounted in the marine tower. The boat is shown provided with the usual hatchways 6 through which the grain or material is delivered into the hold of the boat, or removed therefrom.

A feature of this invention resides in the novel means provided for feeding the bulk material in the hold of the boat to the receiving end of the elevator 4, whereby it may be conveyed thereby to the usual receiving means provided in the marine tower, and from which the grain is distributed to the usual grain tanks 7, partially shown in Figure 1. The means provided for thus feeding the bulk grain to the elevator 4 comprises a portable conveyer unit, generally indicated by the numeral 8, in Figures 1 and 2.

The conveyer unit 8 is shown in its simplest form, in Figures 3 and 4, and comprises a feed screw 55 having one end supported in a suitable bearing 56 provided in a frame 57, upon which is mounted a motor 58. The motor 58 has a suitable drive 59 connecting it with the feed screw 55, whereby, when the motor is operated, the feed screw will be rotated. The frame 57 is shown supported upon suitable casters 61 to facilitate moving the unit around upon the floor.

A suitable wheel 62 may be provided at the opposite end of the feed screw 55 to facilitate moving the unit about upon a floor, as shown in Figure 4. A suitable hook 63 is provided at the outer end of the feed screw 55, whereby it may be connected to the marine leg or some other suitable support, when the conveyer unit is in operation, to thereby prevent it from moving longitudinally. The motor is shown enclosed within a suitable housing 64.

The conveyer unit shown in Figures 5, 6, and 7, generally indicated by the numeral 10 in Figure 2, comprises two oppositely extending feed screws 65 and 66, the former being shown relatively larger and longer than the latter. The feed screws 65 and 66 are arranged in spaced relation, laterally, as best shown in Figure 6, and their adjacent ends are supported in suitable bearings provided in a frame 67 shown mounted upon suitable casters 68. A motor 69 is supported on the frame 67 and is shown having a chain drive 71 connecting it with the relatively larger feed screw 65. The relatively smaller feed screw 66 is shown driven by a chain 72, operatively connecting it with a counter shaft 73, which, in turn, is driven from the motor by a chain 74. By thus operatively connecting the two feed screws to the motor 69, when the latter is operated, the two feed screws will rotate in the same direction, as will readily be understood by reference to Figure 7.

The outer end of the relatively smaller feed screw 66 may be supported by a suitable wheel 75 which cooperates with the casters 68 to support the feed screw in spaced relation to the floor line, as clearly illustrated in Figure 5. The outer end of the relatively larger feed screw 65 may also be provided with a supporting wheel 76, and it has a suitable hook 77 whereby the unit may be anchored to the marine leg or some other support, when in use. In some instances, the supporting wheels 75 and 76 at the ends of the feed screws may be dispensed with as they have no particular function when the feed screws are operating in a mass of bulk material or grain, their only utility being to space the feed screws from the floor to thereby facilitate moving the unit about from place to place. The motor 69 shown in Figures 5, 6, and 7, is enclosed within a suitable housing 78 which primarily is for the purpose of preventing dust and other foreign matter from getting into the motor.

The conveyer units illustrated in Figures 3 to 7 are very simple in construction and have proven very efficient and practical as a means for feeding or moving bulk material, such as grain, towards a suitable receiving means such as the bucket elevator of a marine tower.

In operation, the conveyer unit 8 is lowered through one of the usual hatchways 6 of the vessel, on top of the bulk material or grain in the hold thereof, as best shown in Figure 1. Its hook 63 is then suitably anchored to the lower end of the marine leg 4, or to some other fixed support, by a suitable connection 122, to thereby prevent the unit from moving longitudinally, when the feed screw 55 is operated. The conveyer unit 10, shown in Figures 5, 6, and 7, is particularly well adapted for conveying bulk grain or other material away from a wall, or out of the corner of a bin, because of the conveyer screw 66, which may be positioned close to the bin wall, as shown in Figure 2, for example. In the operation of the conveyer unit 10, the smaller feed screw 66 conveys the grain to the relatively larger feed screw 65, which then conveys it to the marine leg 4. In the drawings, I have shown the feed screw 66 as being smaller than the feed screw 65, but if desired, the two screws may be made substantially the same size.

The feed screws, as shown in Figures 3 to 8, inclusive, are completely open or exposed, that is, there are no frame members or other obstructions adjacent thereto which might interfere with the movement of the grain. When the conveyer unit is positioned on top of the bulk material or grain, its entire weight is supported directly thereon, whereby the grain is rapidly moved in the direction of the arrow, shown in Figure 1, when the feed screw is operated. As the material is fed towards the marine leg, by the conveyer unit, the latter gradually descends into the bulk material, as clearly illustrated in Figure 1.

In Figure 2, two conveyer units 8 are shown connected to the marine leg 4, whereby the bulk material in the hold of the vessel is fed towards the marine leg from two sides. The conveyer units may readily be moved about within the hold of the vessel by means of a suitable lifting cable 123, depending from a boom 124 operated by suitable cables 125 operatively connected to a winding mechanism, indicated generally by the numeral 100.

Figure 9:
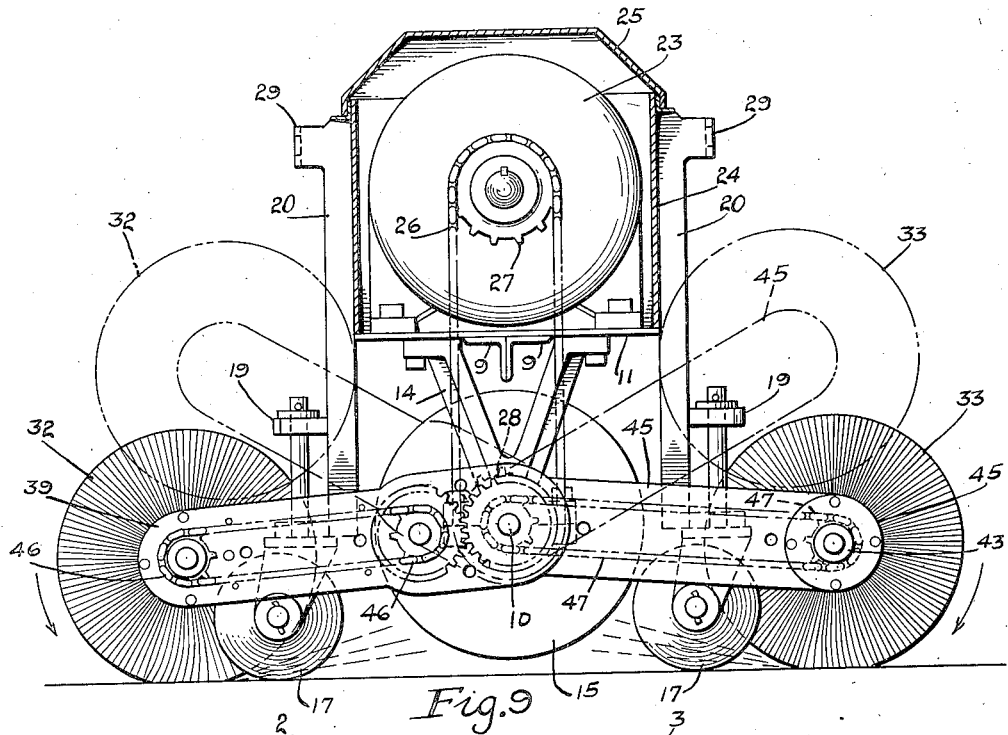
Figure 9 is an end view of Figure 8, partially broken away.

The conveyer unit shown in Figures 8, 9, and 10 comprises a longitudinally extending frame member 9 having a plate 11 secured to one end thereof and a cross member 13 to its opposite end. A suitable bearing bracket 14 is secured to the plate 11 and supports one end of a shaft 10, upon which a feed screw 15 is fixedly mounted. The opposite end of the shaft 10 is supported in a suitable bearing 16 secured to the cross member 13, as shown in Figure 10.

The longitudinally extending frame member 9, plate 11, and cross member 13, cooperate to provide the supporting structure of the unit, which structure is supported upon suitable casters 17 and 18, the former being swiveled in lugs 19 secured to upright frame members 20. The casters 18 are swiveled in suitable brackets 21 mounted on a frame member 22, secured at its upper portion to the cross member 13, as best shown in Figure 10. The casters 17 and 18 are so arranged with respect to the feed screw 15 that the lower portion of the screw is spaced slightly above the level of the floor, as shown in Figure 9.

The feed screw 15 is driven from a suitable motor 23 mounted upon the plate 11, and enclosed within a suitable housing 24, having a removable top portion or closure 25. The driving connection between the motor and the feed screw is shown comprising a chain 26 operatively engaged with sprockets 27 and 28 provided respectively upon the motor and feed screw shaft 10, as will be noted by reference to Figure 9, whereby when the motor is operating, the feed screw will be rotated.

Suitable apertured lifting lugs 29 may be provided upon the housing 24, and a similar lifting lug 31 is shown provided upon the cross member 13, whereby suitable lifting cables, not shown, may be connected to the unit to bodily lift it off the floor.

In some instances, it may be desirable to provide means for feeding the material inwardly towards the feed screw 15, whereby a greater amount of material may be moved without relatively shifting the position of the unit. Such a means is shown in Figures 8 and 9, and may consist of a pair of rotary brushes 32 and 33 supported on shafts 34 and 35, respectively. The shaft 34 is supported in bearings 36 and 37 secured to a pair of arms 38 and 39, pivotally supported upon the shaft 10 of the feed screw 15. The shaft 35 is mounted in similar bearings 42 and 43 secured to arms 44 and 45, respectively, which, like the arms 38 and 39, are pivotally supported upon the shaft 10 of the feed screw.

The brushes 32 and 33 are driven from the shaft 10 of the feed screw by suitable chain drives 46 and 47. Suitable back gears 48 and 49 are mounted upon the arm 39 and the feed screw shaft 10, respectively, to reverse the direction of rotation of the brush 32 with respect to the rotation of the brush 33, so that said brushes will rotate in the directions indicated by the arrows in Figure 9. Suitable housings 51, 52, and 53 enclose the gear drives 46, 47, and 26, as shown in Figures 8 and 9.

By thus operatively connecting the brushes 32 and 33 with the motor 23, when the latter is operated to drive the feed screw 15, the brushes will be rotated in directions to feed the material inwardly towards the feed screw, as shown in Figure 9. It is also to be noted that the brushes contact directly with the floor, whereby the grain will be cleanly swept from the floor towards the feed screw, and whereby the latter will feed substantially all of the grain with which it comes in contact, to the marine leg or elevator 4, as will be clearly understood by reference to Figures 1 and 2.

Suitable means, not shown, is provided for holding the brushes 32 and 33 in the elevated inoperative positions, indicated by the broken lines in Figure 9. A suitable eye 54 is provided at one end of the unit, as shown in Figure 8, whereby it may be anchored to the marine leg or to some other fixed support, to prevent longitudinal movement of the unit when in operation.

In Figures 11, 12, and 13, there is illustrated a conveyer unit comprising spaced parallel screws 101 and 102 having shafts 103 and 104, respectively, journaled in bearings 105 and 106 of a longitudinal frame member 107.

A suitable platform or plate 108 is provided at one end of the frame member 107 and supports a motor 109 having a flexible coupling 111 connecting it with a drive shaft 112, supported in suitable bearings secured to the walls of a housing 113. A chain drive 114 is shown connecting the shaft 112 to a counter shaft 115, operatively connected to the shaft 104 of the feed screw 102 by a chain drive 116. The shaft 103 of the feed screw 101 is operatively connected to the counter shaft 115 by suitable back gears 117, whereby the feed screws 101 and 102 will rotate in opposite directions, as indicated by the arrows in Figure 13. The housing 113 may be supported directly upon the floor, as shown in Figure 11, and the opposite end of the apparatus may be supported in a similar manner by means of a suitable frame member 118. A suitable lifting eye 119 is provided at one end of the apparatus, and a similar lifting eye 121 may be provided upon the housing 113, whereby the entire apparatus may be bodily lifted off the floor by suitable lifting cables.

If desired, suitable swivel casters, not shown, may be provided at the ends of the apparatus, as shown, for example, in Figures 8 and 9, to facilitate moving it about from place to place upon the floor.

The novel conveyer unit herein disclosed has been found very practical for unloading bulk grain from boats and grain cars. The unit being portable, and comparatively light, may readily be lifted off the floor and lowered through the hatchways of a vessel and into the hold thereof, as shown in Figure 1, on top of the mass of grain. It is then connected to the marine leg 4 by a suitable connection 122 to prevent it from backing or moving away from the leg when the feed screw is operated. When the feed screw is rotated, it will feed the bulk grain or material from under it and from the sides thereof, towards the marine leg or elevator 4, as indicated by the arrow in Figure 1, until it eventually descends to the floor of the boat. If desired, two or more conveyer sections 8 may be employed, as shown in Figure 2, to expedite unloading of the grain from the vessel. It may also be found desirable, at times, to employ relatively shorter conveyer sections arranged in such a manner as to feed the material at the sides of the vessel towards the conveyer sections 8, whereby substantially all of the grain or material in the hull of the vessel may be removed therefrom without manual labor.

The novel conveying unit herein disclosed is very simple and inexpensive in construction, and has been found to be very quiet and efficient in operation. By its employment, the operation of unloading bulk material from a boat or grain car is expedited, and unskilled labor only is required. Each conveyer section 8 is provided with a motor, which motors have independent controls whereby they may be operated independently of one another. Each conveyer section may be provided with suitable lifting eyes whereby lifting cables may be attached thereto to bodily lift the sections off the floor, as when lowering them into and out of the hull of a vessel. The conveyer sections may be of any desired length, and they may be provided with one or more feed screws, as herein set forth. Because of the portability of the apparatus, several interconnected hatches in the hull of a boat may be unloaded without removing the conveyer unit therefrom. By elevating the marine leg to a position above the boat's deck, the boat may be moved relatively to the marine tower without lifting the conveyer 8 out of the boat's hull, thereby dispensing with the usual operations of unrigging and rerigging the apparatus, which is necessary when employing ordinary grain shovels for unloading purposes.

I claim as my invention:

1. In a portable conveyer unit, a feed screw provided at its ends with suitable supports, a motor on said unit having an operative connection with said feed screw, and longitudinally extending rotary elements at the sides of the screw for feeding the material thereto.

2. In a portable conveyer unit, a feed screw provided at one end with a suitable support, a motor on said support having an operative connection with said feed screw, and longitudinally extending rotary elements at the sides of the screw for feeding the material thereto, said elements being capable of vertical adjustment.

3. In a portable conveyer unit, a feed screw, a motor for driving said screw, longitudinally extending rotary elements adjacent to the screw for feeding the material thereto, and means operatively connecting said elements to said screw and whereby the elements will rotate in opposite directions.

4. In a conveyer unit, an open feed screw provided at one end with a suitable support, a motor having an operative connection with said feed screw, and longitudinally extending rotary brushes at the sides of the screw for feeding the material thereto, said brushes having driving connections with the motor, whereby they are rotated in opposite directions.

FRANCIS A. BEAN.